United States Patent [19]
Hoyle

[11] Patent Number: 6,079,643
[45] Date of Patent: Jun. 27, 2000

[54] SPREAD PATH MODIFIER FOR AGRICULTURAL SPREADER

[76] Inventor: David Stanley Hoyle, Box 67, Maungaturoto 1240, New Zealand

[21] Appl. No.: 08/867,088

[22] Filed: Jun. 2, 1997

Related U.S. Application Data

[63] Continuation-in-part of application No. 08/379,523, Feb. 2, 1995, abandoned.

[51] Int. Cl.[7] .................................................. A01C 17/00
[52] U.S. Cl. ............................................................ 239/681
[58] Field of Search .................................. 239/665–667, 239/682, 688, 689, 687, 691; 222/281, 410

[56] References Cited

U.S. PATENT DOCUMENTS

| 3,473,739 | 10/1969 | Singleton . |
| 4,216,914 | 8/1980 | O'Hanlon . |

FOREIGN PATENT DOCUMENTS

| 0 269 501 | 6/1988 | European Pat. Off. . |
| 0 532 055 | 3/1993 | European Pat. Off. . |
| 1 400 911 | 4/1965 | France . |
| 2 637 448 | 4/1990 | France . |
| 33 41 703 | 5/1985 | Germany . |
| 38 20 681 | 12/1989 | Germany . |
| 38 33 638 | 4/1990 | Germany . |

*Primary Examiner*—Christopher P. Schwartz
*Assistant Examiner*—C. T. Bartz
*Attorney, Agent, or Firm*—Smith-Hill and Bedell

[57] ABSTRACT

An agricultural spreader comprises a bulk material container and a pair of side by side spinners. A main cover overlies the spinners and has a feed surface surrounding a charging port for each spinner in the front inner quadrant of the spinner. The charging port in use admits air with the bulk material. A front deflector is adjacent the front inner quadrant of each spinner. An outlet cover is mounted at or near the circumference of each spinner just above the spinner. A side by side series of side deflectors is restricted exclusively to an area outward of the front outer quadrant and extends from the outlet cover into the path of the material leaving the spinner in the front outer quadrant in order to deflect the material from the spreader into the spread path. Material is delivered from the bulk material container to a location which is above the feed surface and from which the material drops onto the feed surface for feeding toward the charging ports. The space through which the material drops to the feed surface is open laterally to the exterior of the spreader, for supplying air to the charging ports.

16 Claims, 3 Drawing Sheets

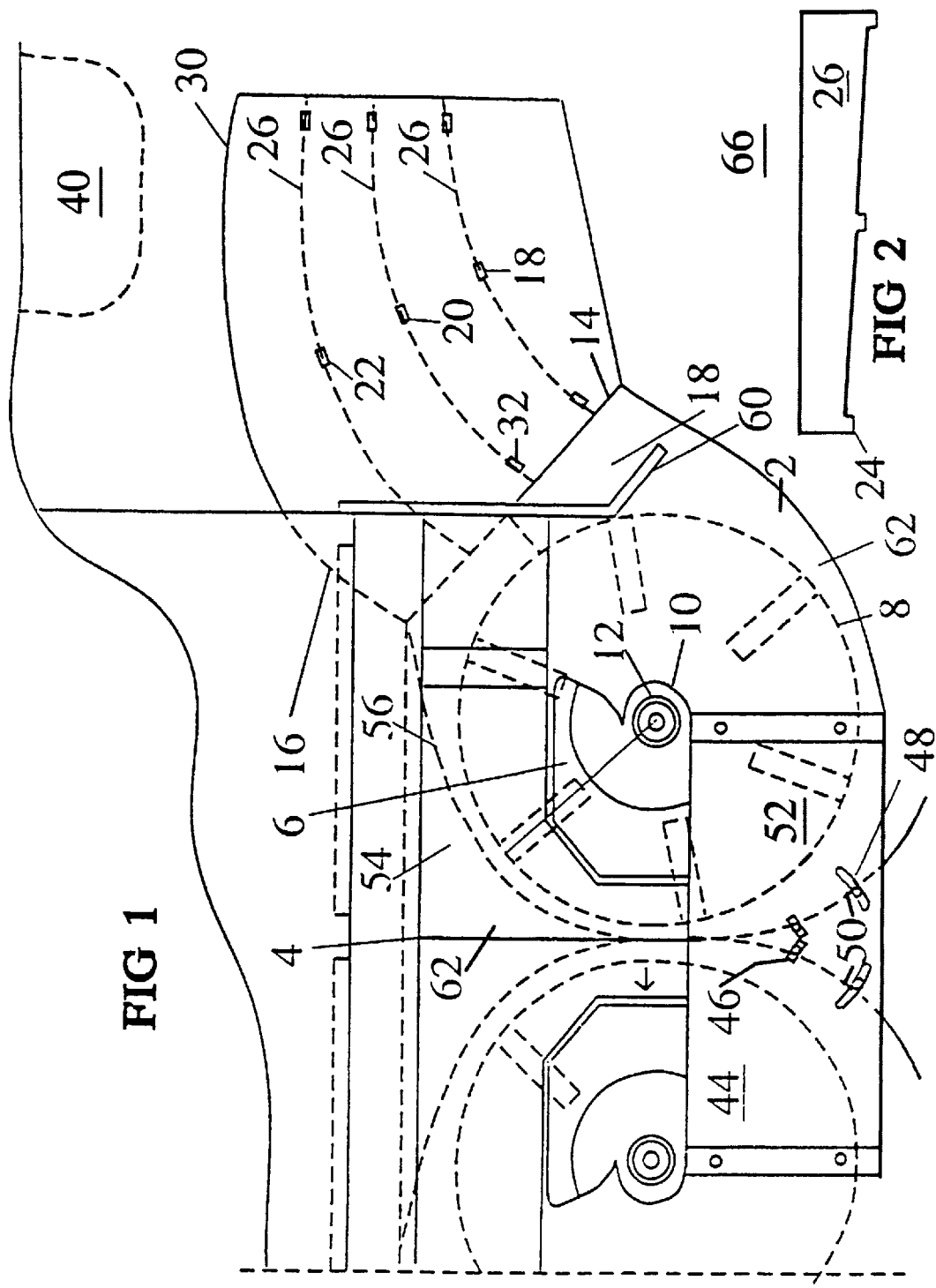

SPREAD PATH MODIFIER FOR AGRICULTURAL SPREADER

CROSS-REFERENCE TO RELATED APPLICATION

This present application is a continuation-in-part of U.S. application Ser. No. 08/379,523 filed Feb. 2, 1995, now abandoned.

TECHNICAL FIELD

This invention concerns spread path modifiers for agricultural spreaders of the spinner type.

BACKGROUND ART

Spreaders may be loaded with a variety of materials of different density, grain size and water content. Most commercial spreader material contains fines mixed with the lumps, pellets, granules or powder constituting the main weight of the material to be spread.

Fines cannot be thrown as far by the spinners as the heavier material and these tend to be deposited in a band across the rear of the spreader from wheel to wheel while the heavier material lands toward the maximum range of the spinner. Thus the fines present a problem. If the material is granulated by dampening with water, when thrown from the spinners it may shatter into fines against the spreader vehicle and undergo minimal spreading. Even if a guard is provided around the rear of the vehicle, fines tend to stick to the guard and build-up may occur.

Refinements in vehicle guidance and the metering of material have advanced to the stage where the performance of the spinners now lags and a patchy spread pattern is not acceptable. The spread path lies in a band to the left and right of the spinners up to 20 meters wide depending on the mass of the particles and spinner rpm. The spreading contractor aims for minimum band overlap. The material leaves the spinners from all four quadrants—and inevitably the material leaving the inner rear quadrant spreads to the rear. Material leaving the outer front quadrant strikes the vehicle's extremity.

The object of this invention is to deal differently with the material which strikes the spreader in the course of spreading.

SUMMARY OF THE INVENTION

This invention provides a deflector assembly for an agricultural spreader of the type having a pair of side by side spinners which in use are top fed from a bulk material container and wherein each spreader has a spread zone comprising a front inner quadrant; a front outer quadrant; a rear inner quadrant and a rear outer quadrant; and there is a front deflector adjacent the inner front quadrant of the spinner, a rear deflector adjacent the inner rear quadrant of the spinner, a cover mounted at or near the circumference of each spinner just above the same and a side by side series of deflectors extending from the cover into the path of the material which leaves the spinner in the front outer quadrant in order to deflect the material from the spreader vehicle into the spread path.

A main cover may overlie the spinners. The assembly will work without a cover but not as effectively. The front deflector 100–150 mm deep may depend from the main cover in order to act in the quadrant adjacent the material inlet. This front deflector may be non-adjustable and located just beyond the sweep of the spinner in order to maintain air speed, entraining material in the moving air. The rear deflector which acts in the inner rear quadrant may be adjustable and of the same depth in order to vary the spread path. If the contractor wishes to spread in an orchard the rear deflectors are both adjusted to release material at the rear thereby reducing band width.

The side deflectors may be mounted on an extension of the main cover. The extension may be separable from the main deflector in order to be replaceable, repairable or an accessory.

The extension may lie at an angle of 5–15 degrees to the cover. The extension may be trapezoidal or mitre shaped and slightly curved but more usually will be flat. The extension is conveniently a metal sheet or plate.

The side deflectors may be disposed with substantially equal spacing across the face of the extension. The side deflectors may be arcuate. The side deflectors may be curved convexly with respect to the ground in order to modify the airstream moving past the side deflectors. The aim is to modify the trajectory of the thrown material just sufficiently to miss the spreader and in doing so exert a self cleaning action on the deflector surfaces and keep the rear of the spreader free of adhered material. Accordingly the side deflectors are situated so that the air stream meets the leading part of the deflector at an acute angle, 10 degrees or preferably less. The less the material is diverted the greater the retained momentum. Small tuning adjustments are possible by noting the polish pattern which appears on the deflectors after use.

The side deflectors may have equal radius of curvature and may be spaced equally across the plate. Alternatively the side deflectors may be of equal radius of curvature and disposed in a mutually converging array so as to accelerate the airstream passing between them.

Instead one or more side deflectors may have a curve of changing radius. The side deflectors may be trapezoidal in plan.

The extension plate may be slotted along the path of each guide. The side deflectors may have lugs which project through the slots enabling a clean joint at 90 degrees. Welds on the rear face of the extension plate hold the side deflectors in place without affording any site where buildup may start. The front and rear deflectors, side deflectors and extension may be made from sheet metal blanks. The main cover may be made from mild steel. The extension plates and side deflectors may be made from stainless alloys, for example stainless steels.

One embodiment is now described with reference to the accompanying drawings.

BRIEF DESCRIPTION OF THE DRAWINGS

FIG. 1 is a plan of the deflector assembly for a pair of spinners;

FIG. 2 is a plan of a side deflector;

BEST MODE FOR CARRYING OUT THE INVENTION

Figure 3:
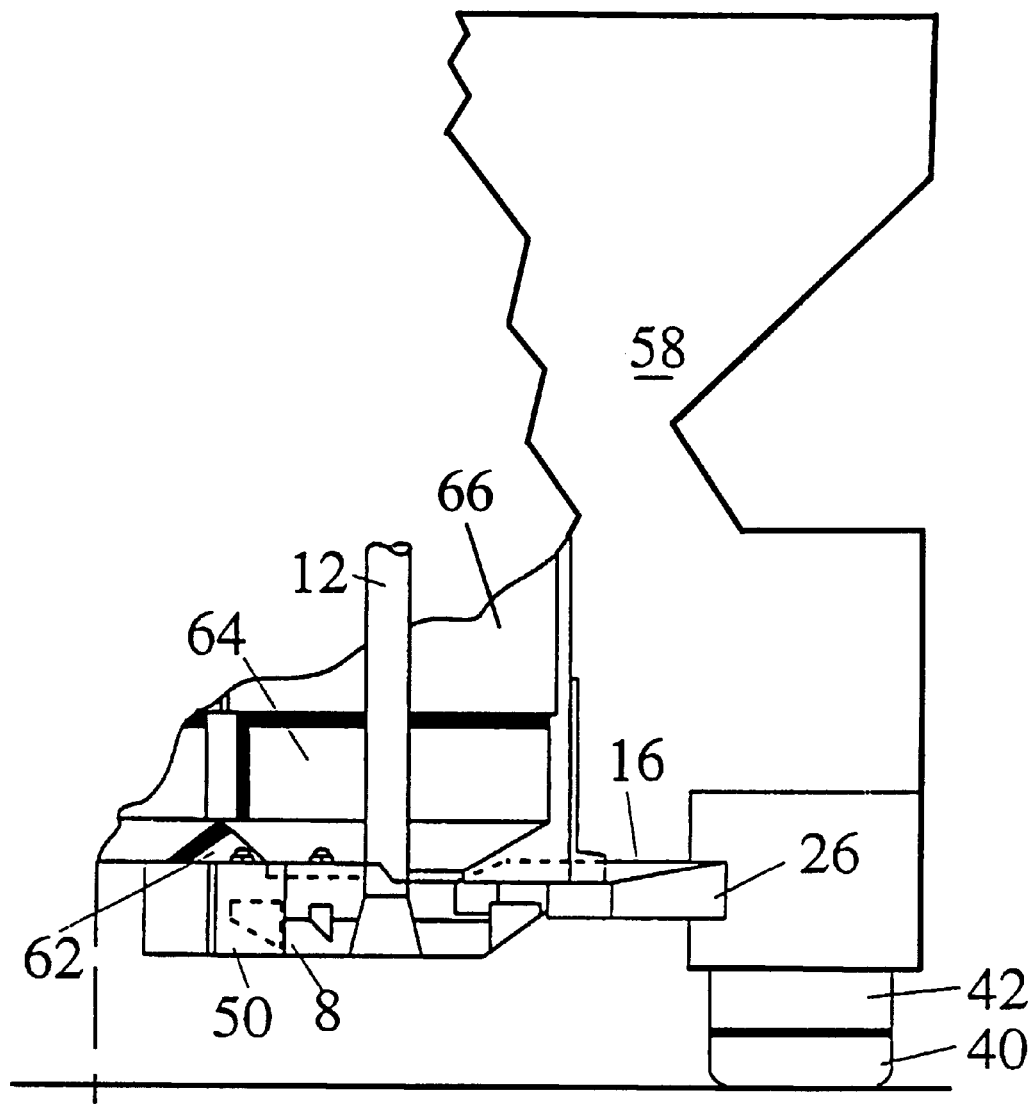
FIG. 3 is a rear view of half of the assembly serving the RH spinner.
Figure 4:
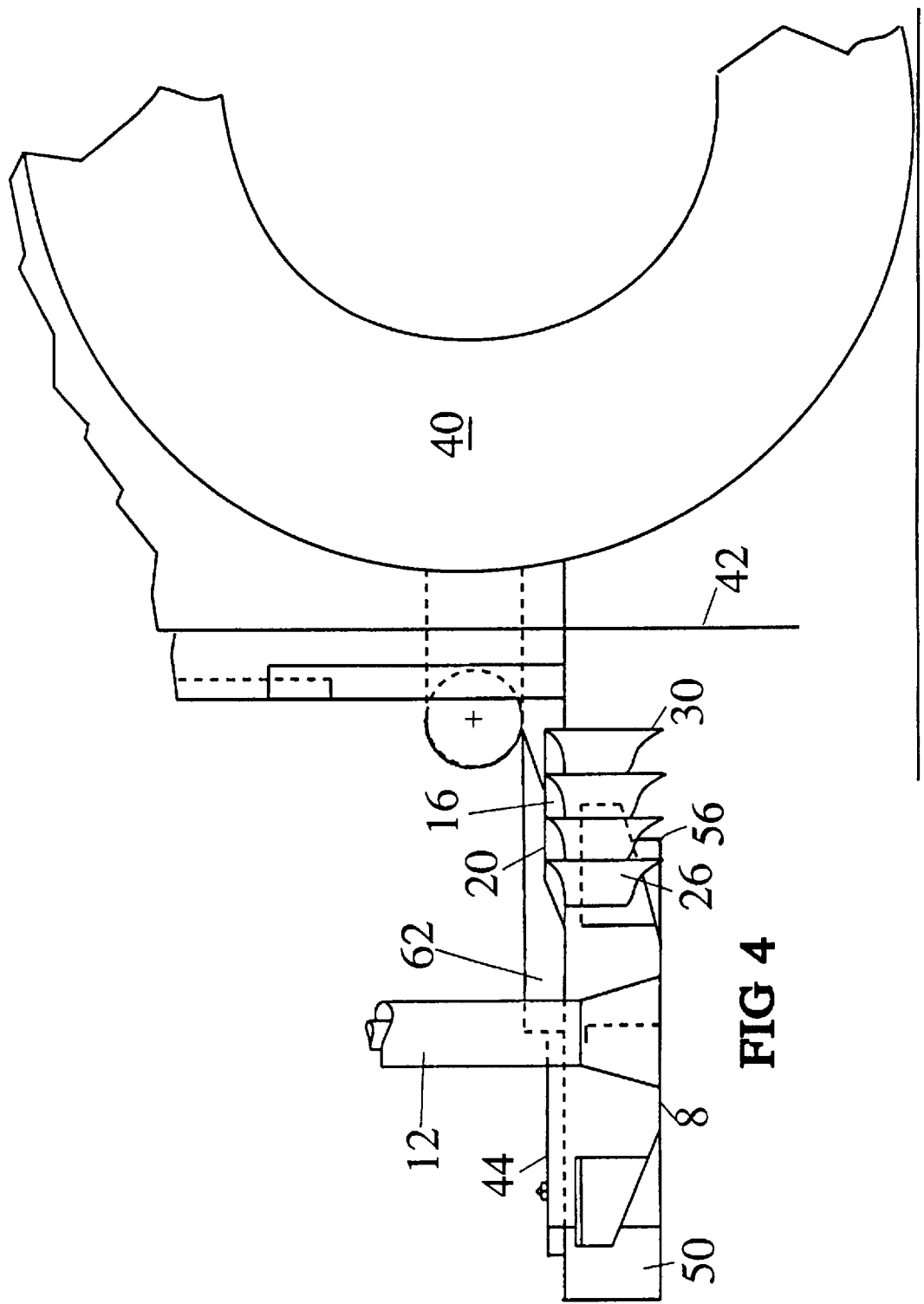
FIG. 4 is a side view of one of the spinners and the side deflectors on the adjacent extension plate.

Referring now to FIGS. 1 and 2, the main cover 2 is cut from a single sheet of mild steel. The centre axis 4 divides the main cover symmetrically; only the RH half is described.

A port 6 allows entry of spreader material to the spinner 8 (see FIG. 2) and cutout 10 allows the cover 2 to overlie the spinner 8 and lie close to the spinner shaft 12. The straight edge 14 of the main cover is drilled to receive a bolt on stainless steel trapezoidal extension plate or outlet cover 16. The extension plate lies at ten degrees raised inclination to the edge of the main cover. The extension plate 16 is pierced by an upper trio of slots 18, a lower trio of slots 20 and a middle trio of slots 22.

Each trio of slots receives the lugs 24 of a stainless steel side deflector plate 26 which is curved to conform to the slots. The lugs are welded to the upper face 28 of the extension plate (best seen in FIG. 3) and project vertically into and approximately parallel to the centrifugal path of the moving material. A fourth side deflector 30 has no lugs but is butt welded to the edge of the extension plate.

The side deflectors are trapezoidal in shape being 110 mm wide at the spinner end and 200 mm wide at the opposite end. The spinner ends 32 of the two rearmost side deflectors 26 mutually diverge slightly. The dispositions of the side deflectors may be seen clearly in FIGS. 1 and 3.

The wheel 40 and mud flaps 42 stand clear of the side deflectors which direct the material at about 90 degrees to the direction of spreader travel. The cover 2 has a raised section 44 with curved slots 46,48 which allow the positions of curved rear deflector 50 to be selected. The rear deflector 50 controls the discharge of material from the inner rear quadrant 52.

Similarly discharge of material from the inner front quadrant 54 is prevented by a curved, non-adjustable front deflector 56 which depends vertically from the main cover 2. The front deflector lies close to the sweep of the spinners in order to deflect the material back into the airstream. The entire spreader assembly is suspended from the spreader container 58 by brackets 60.

A sheet metal apron 62 provides ramp faces around the conveyor 64 to direct material to the port 6. A rise and fall gate 66 controls the delivery of endless belt conveyor 64. The sloping sides of the bulk spreader 58 direct granules and powder to the conveyor 64. The conveyor moves granules and powder along the central longitudinal axis toward the rear where they fall onto ramp faces around port 6.

The spinner shaft 12 projects through the port 6 but otherwise the space surrounding the port is kept free of obstruction to allow air to flow into the port along with the granules and powder. In use the spreading operation tends to require more spinner speed rather than less. The spinners act as air impellers, displacing air centrifugally. Air is supplied to the spinners by flow through the port at the center of the spinner. Momentum is imparted to the bulk material by virtue of its being entrained in the flow of air rather than by impact with the blades of the spinner.

In use the RH spinner rotates anti-clockwise. The material reaches the spinner in the front inner quadrant. The spinner accelerates the material. Some strikes the rear deflector and much leaves in the rear outer quadrant 62, the remainder being accelerated further by the spinner toward the front outer quadrant where it meets the side deflectors at very acute angles, typically in the range 4–9 degrees. This allows the material to be thrown a useful distance while ensuring it misses the spreader. Most of the material has discharged by the time the front inner quadrant is reached so the front deflector does not work as hard as the rear deflector. At this point a fresh load of material is added to the system.

The deflectors allow an arc of spread 66 of 30–40 degrees.

I claim:

1. A deflector assembly for an agricultural spreader of the type having a pair of side by side spinners which in use are top fed from a bulk material container and wherein each spinner has a spread zone comprising a front inner quadrant;

a front outer quadrant;

a rear inner quadrant; and a rear outer quadrant;

and wherein the deflector assembly comprises a main cover overlying the spinners and having a charging port for each spinner in the front inner quadrant which in use admits air with the bulk material, a front deflector adjacent the front inner quadrant of each spinner, an outlet cover mounted at or near the circumference of each spinner just above the spinner, and a side by side series of side deflectors restricted exclusively to an area outward of the front outer quadrant and extending from the outlet cover into the path of the material leaving the spinner in the front outer quadrant in order to deflect the material from the spreader into a spread path defined below the outlet cover, and wherein the main cover covers sufficient area of the spinners that, in combination with the front deflector and the outlet cover, the spinners when rotating act as impellers pumping an air/material mix from the charging port to the spread path.

2. A deflector assembly as claimed in claim 1, wherein the outlet cover is a separable extension of the main cover.

3. A deflector assembly as claimed in claim 2, wherein the outlet cover is inclined upwardly at 5–15° to the plane of the spinner.

4. A deflector assembly as claimed in claim 3, wherein the front deflector which acts at the spinner's inner front quadrant lies close to the circumference of the spinner.

5. A deflector assembly as claimed in claim 2, wherein the side deflectors are joined to the outlet cover without any obstruction which could build up accumulations of lighter material.

6. A deflector assembly as claimed in claim 1, wherein the direction of the side deflectors lies at an acute angle to the path of the material leaving the spinner in the outer front quadrant.

7. A deflector as claimed in claim 6, wherein the side deflectors are of shallow arcuate disposition.

8. A deflector assembly as claimed in claim 1, wherein the spinners are a left spinner and a right spinner with respect to direction of movement of the spreader in use, and the left and right spinners rotate clockwise and counterclockwise respectively when viewed from above.

9. A deflector assembly as claimed in claim 1, wherein the side deflectors are a series of strips lying at 90° to the cover.

10. A deflector assembly as claimed in claim 9, wherein the side deflectors project further at the outer end of the strip than at the inner end of the strip.

11. A deflector assembly as claimed in claim 1, comprising a rear deflector adjacent the rear inner quadrant of each spinner, and wherein the rear deflector acts at the rear inner quadrant and is adjustable toward and away from the spinner in order to change the spread path width.

12. A deflector assembly as claimed in claim 1, in combination with an agricultural spreader of the type having side by side spinners.

13. A deflector assembly as claimed in claim 12, wherein the spinners are a left spinner and a right spinner with respect to direction of movement of the spreader in use, and the left and right spinners rotate clockwise and counter-clockwise respectively when viewed from above.

14. A deflector assembly as claimed in claim 1, comprising a rear deflector adjacent the inner rear quadrant of each spinner.

15. A deflector assembly for an agricultural spreader of the type having a pair of side by side spinners which in use are top fed from a bulk material container and wherein each spinner has a spread zone comprising a front inner quadrant;

a front outer quadrant;

a rear inner quadrant; and a rear outer quadrant;

and wherein the deflector assembly comprises a main cover overlying the spinners and having a charging port for each spinner in the front inner quadrant which in use admits air with the bulk material, a front deflector adjacent the front inner quadrant of each spinner, an outlet cover mounted at or near the circumference of each spinner just above the spinner, and a side by side series of side deflectors restricted exclusively to an area outward of the front outer quadrant and extending from the outlet cover into the path of the material leaving the spinner in the front outer quadrant in order to deflect the material from the spreader into the spread path, wherein the side deflectors are of shallow arcuate disposition, the direction of the side deflectors lies at an acute angle to the path of the material leaving the spinner in the outer front quadrant, and two or more of the arcuate deflectors mutually converge in order to accelerate part of the airstream.

16. An agricultural spreader comprising:

a bulk material container, a pair of side by side spinners each having a spread zone comprising a front inner quadrant; a front outer quadrant; a rear inner quadrant; and a rear outer quadrant, a main cover overlying the spinners and having a feed surface surrounding a charging port for each spinner in the front inner quadrant, which charging port in use admits air with the bulk material, a front deflector adjacent the front inner quadrant of each spinner, an outlet cover mounted at or near the circumference of each spinner just above the spinner, a side by side series of side deflectors restricted exclusively to an area outward of the front outer quadrant and extending from the outlet cover into the path of the material leaving the spinner in the front outer quadrant in order to deflect the material from the spreader into a spread path defined below the outlet cover, and a delivery means for delivering material from the bulk material container to a location which is above the feed surface and from which the material drops from the delivery means onto the feed surface for feeding toward the charging ports, and wherein the space through which the material drops from the delivery means to the feed surface is open laterally to the exterior of the spreader, for supplying air to the charging ports and the main cover covers sufficient area of the spinners that, in combination with the front deflector and the outlet cover, the spinners when rotating act as impellers pumping an air/material mix from the charging sort to the spread path.

* * * * *